United States Patent [19]
McIntyre

[11] Patent Number: 5,026,225
[45] Date of Patent: Jun. 25, 1991

[54] PASSENGER AND WHEELCHAIR SECUREMENT SYSTEM FOR VEHICLES

[76] Inventor: Jack L. McIntyre, 6423 - 174th SW., Lynnwood, Wash. 98037

[21] Appl. No.: 319,369

[22] Filed: Mar. 3, 1989

Related U.S. Application Data

[63] Continuation-in-part of Ser. No. 181,562, Apr. 14, 1988, abandoned.

[51] Int. Cl.⁵ .............................................. B60P 7/08
[52] U.S. Cl. ...................................... 410/23; 410/10; 410/51; 280/304.1; 280/808; 296/65.1
[58] Field of Search ................... 410/9, 10, 11, 12, 20, 410/21, 22, 23, 26, 30, 51; 296/65.1; 280/801, 802, 804, 808, 304.1; 297/DIG. 4, 468, 484

[56] References Cited

U.S. PATENT DOCUMENTS

| | | | |
|---|---|---|---|
| 3,955,847 | 5/1976 | Schiowitz | 410/23 |
| 4,060,271 | 11/1977 | Williams | 410/23 |
| 4,257,644 | 3/1981 | Stephens | 410/12 |
| 4,265,478 | 5/1981 | Korsgaard | 410/23 |
| 4,427,210 | 1/1984 | Wevers | 410/23 |
| 4,455,046 | 6/1984 | Linderoth | 410/51 |
| 4,492,403 | 1/1985 | Blomgren et al. | 410/21 |
| 4,688,843 | 8/1987 | Hall | 410/51 |

FOREIGN PATENT DOCUMENTS 2845870 8/1980 Fed. Rep. of Germany ........ 410/12

Primary Examiner—Andres Kashnikow
Assistant Examiner—Christopher G. Trainor
Attorney, Agent, or Firm—George M. Cole

[57] ABSTRACT

Wheelchair and wheelchair occupant restraint and securement system (10) for vehicles in which a track (12,14) in two sections is disposed in spaced apart, parallel relationship on the vehicle floor. A frame securement belt (40) is attached to each of the four corners of the wheelchair frame so that four belts (40) secure the chair to the track sections (12,14). Independent occupant securement is provided with a lap belt (70) which attaches on each side of chair (C) to a track section (12,14). A shoulder harness (90) attaches to the floor behind the occupant of the chair and rearwardly of the occupant separates into two shoulder sections (98) which have buckle loops (102) which secure to the releasable buckle (78,80) of the lap belt (70). A rear stanchion (120) may be provided by attaching the same to the track sections and passing the rearward part of the shoulder harness over the upper part (122) of the stanchion.

3 Claims, 4 Drawing Sheets

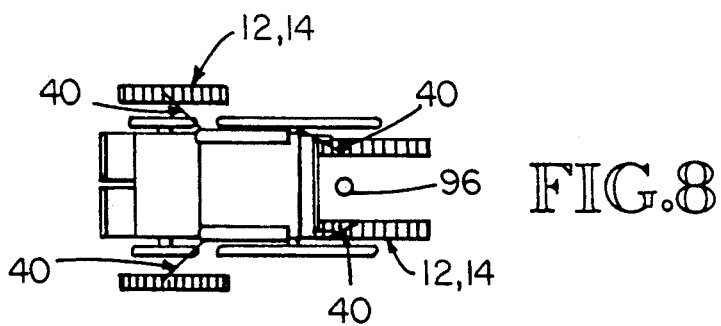
FIG.8
FIG.9
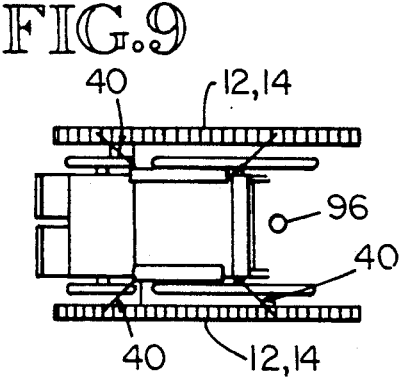
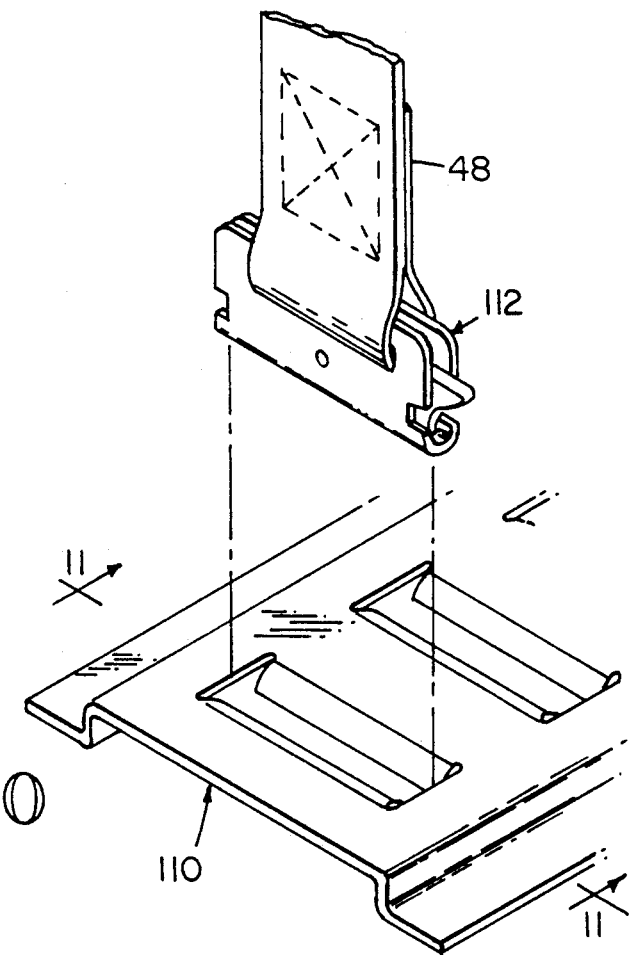
FIG.10
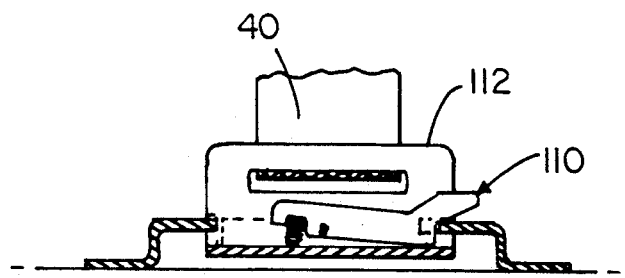
FIG.11

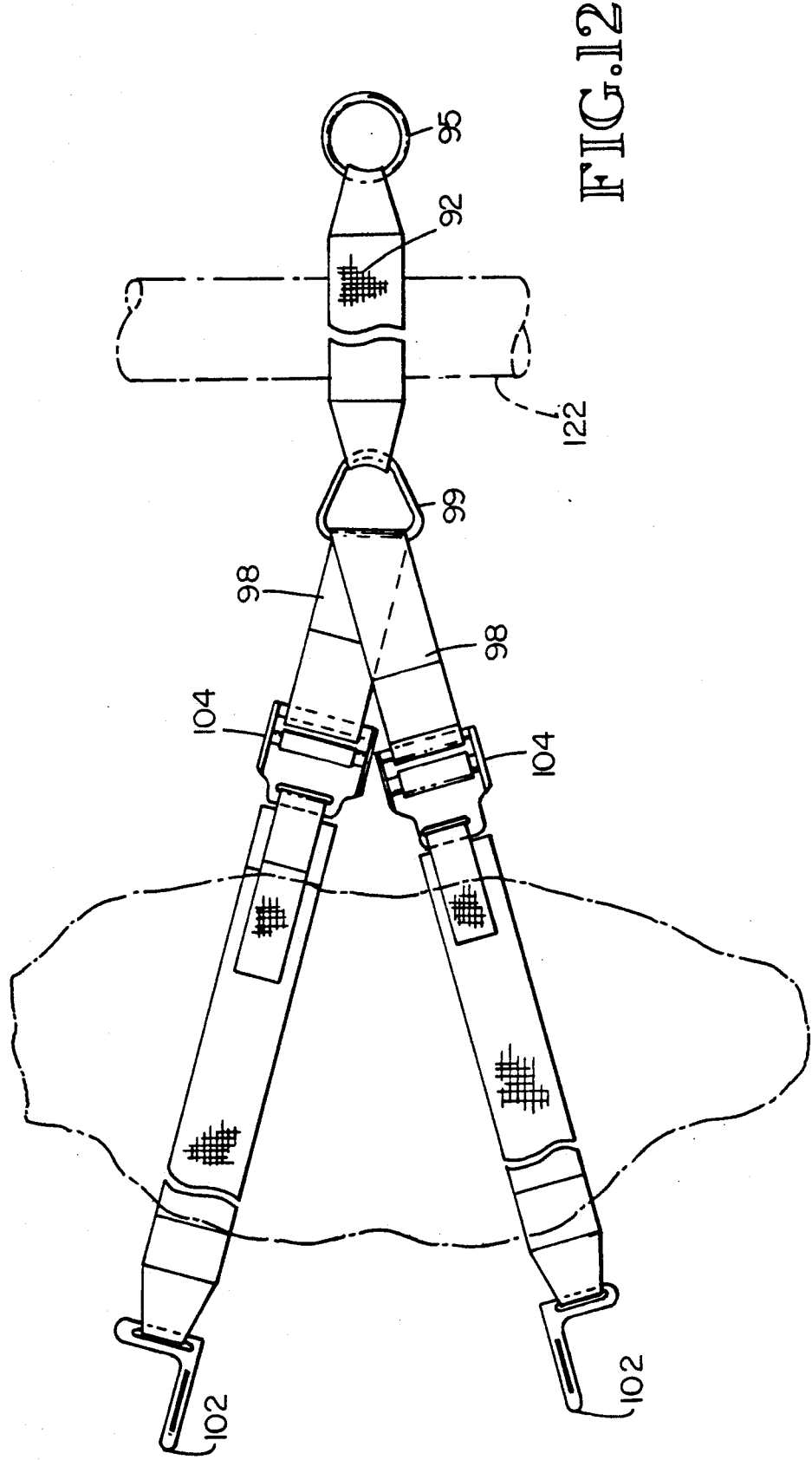

PASSENGER AND WHEELCHAIR SECUREMENT SYSTEM FOR VEHICLES

This application is a continuation-in-part of applicant's co-pending application Ser. No. 181,562, filed Apr. 14, 1988, now abandoned.

DESCRIPTION

1. Technical Field

The invention relates to the field of passenger and wheelchair restraint means for vehicles and the like and more particularly to a passenger and wheelchair securement system for vehicles which includes separate but coacting restraints for both the wheelchair passenger and the wheelchair itself.

2. Background Art

As people who are acquainted with the art are aware, transportation of the handicapped, particularly those confined to a wheelchair, is generally unsatisfactory if not dangerous because of the unsafe design of the restraint systems used with respect to passenger and chair. Many securements for chairs are simply nothing more than jerry-rigged belt attachments and it has been observed that people in wheelchairs have been transported in a vehicle with no restraint at all. A not uncommon occurrence is restraint on the chair and none on the occupant. Another not uncommon situation the restraint of both chair and occupant with a single lap belt. As has been stated in one article, impact or sudden stop protection of wheelchair bound passengers in vans and buses has been non-existent, and hence the drivers of such vehicles must compensate by careful maneuvering and braking. According to the same article even an emergency stop at 7.5 km/h will create chaos among passengers who cannot brace themselves. See H. W. Wevers, WHEELCHAIR AND OCCUPANT RESTRAINT SYSTEM FOR TRANSPORTATION OF HANDICAPPED PASSENGERS, Archives of Physical Medicine and Rehabilitation, Vol. 64, August 1983, Kingston, Ontario, Canada.

Automobile seats are designed so that a considerable part of the forward deceleration force is born by the buttocks. A wheelchair does not provided this support. Besides the above examples of unsatisfactory securement, other instances involved a case in which an electric wheelchair weighing about 250 pounds and the passenger were strapped by one lap belt. Another example of unsatisfactory securement is the type belt which is installed on retractors and which enables the chair to move a given distance before the belt takes hold.

The several types of restraints for wheelchairs include clamp mechanisms which engage both of the larger wheels and which because nature of design principles allow limited movement of the smaller castor wheels from side to side. The clamping devices, occasionally referred to as a "crab claw" are anchored to the side of the vehicle for aisle facing and to flip up seats for forward facing. These may be provided with or without securement for the chair occupant though normally occupant securement is not provided.

Another common type of restraint system is the side or aisle facing with straps on the four corners of the chair frame and which may or may not include a lap belt for the passenger. If the vehicle stops suddenly or if there is accident impact, the passenger's body is thrown sideways, creating the risk of internal and spinal injuries. In this arrangement one wheel absorbs all the inertial forces as well as the passenger's weight and there is a tendency for the chair to fold and turn over or for the wheel to collapse.

Forward facing systems include strap securement of all four corners of the chair frame and a lap belt for the passenger which attaches either to the chair itself or to a connector buckle on a floor strap. In effect, one belt is doing double duty by restraining both chair and occupant. Another arrangement in a forward facing system is a shoulder strap which attaches to the wall of the van or bus, passes diagonally across the chest to anchor to the chair or to a floor strap. Attachment to the vehicle wall may be and commonly is 2 to 3 feet from the occupant at a point above the window. The strap angling across one shoulder to attach to the chair or another belt results, in the case of sudden stop or impact, in the pivot or twisting of the free shoulder while the belted shoulder is restrained. Again, a sudden or violent wrenching or twisting of the body can result in potential damage to the spine.

While the above systems are common and widely used they do not provided the safety margin that is required or acceptable.

Among the known prior art which are of interest to the invention herein are U.S. Pat. Nos. 4,060,271; 4,257,644; 4,427,210; 4,492,403; 4,688,843; 4,265,478 and West German Offenlegungsschrift 2845870. These devices or systems illustrate use of chains, wheel coffers, brackets which are bolted to the chair frame and to which lap and floor belts for the chair are attached, and hood members for the tops of the large wheels and which act as restraints. None of the cited references, however, is considered pertinent or material to the system herein described and claimed.

SUMMARY OF THE INVENTION

The invention embraces a pair of spaced apart track means to which are secured to the vehicle floor and which have a plurality of anchoring locations at predetermined spacings along the length of the track. Four corner wheelchair frame straps or belts attach to the wheelchair and to the tracks. A lap belt is attached one end to each track. A shoulder harness with a strap for each shoulder extends from attachment with the lap buckle, over each shoulder to join together behind the passenger and anchor to a tie-down means behind the chair. Thus, restraint of the chair is independent of restraint on the occupant of the chair.

Accordingly, it is among the many features and advantages of the invention to provide a wheelchair restraint system for vehicles which is simple, safe, and is the equivalent of a vehicle seat in that the same forces needed to dislodge a vehicle seat are the same forces required to force the wheelchair from its securement system. The passenger lap belt becomes integral with the shoulder harness. The shoulder harness having a strap for each shoulder keeps the spine in line because it does not allow the body to twist or pivot. Thus, damage to the spine and internal organs is minimized from sudden stops or impacts, though the system cannot prevent injury. Occupant and chair restraint belts and straps are size and color coded so that in case of evacuation of the vehicle it is known which belts release the chair and which ones release the passenger. Loads or forces applied to the body with this system are applied over a much greater area thus reducing the unit forces at points of contact. Additionally the buckle that releases the lap belt also releases the shoulder harness to free the individual occupant. The invention as an optional piece of the system can include a stanchion behind the chair which attaches to the tracks and which is capable of supporting such accessories as a head rest. The system is adjustable and flexible enough so that it can be used with most mobility aids. Again, the system is such that it assures the passenger of maximum safety and minimum injury in case of accident within a reasonable or acceptable cost per wheelchair securement location.

BRIEF DESCRIPTION OF THE DRAWINGS

FIG. 10 is a partial perspective view showing another type of track and connector which may be used with the system of the invention.

FIG. 11 is a partial cross section view in elevation showing additional details of the belt connector of FIG. 10, and FIG. 12 is a plan view showing the adjustment hardware for the shoulder harness as being between the wearer and the stanchion behind the chair.

BEST MODE FOR CARRYING OUT THE INVENTION

Figure 1:
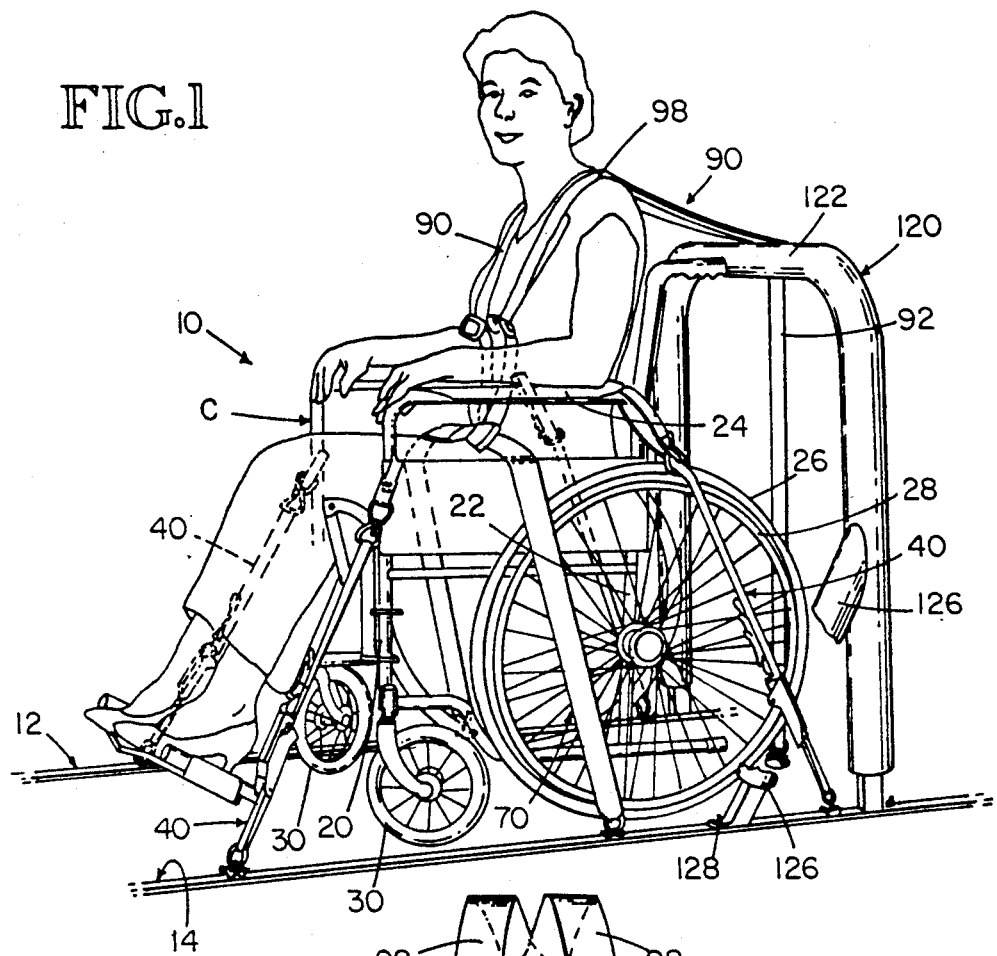
FIG. 1 is a view in perspective of a person fully secured as a passenger in a vehicle according to the system of this invention.

Referring now to the drawings it will be seen that the securement system of the invention, generally referred to by the number 10, is shown with the wheelchair and occupant secured at the location within the transporting vehicle. The system includes spaced apart track sections 12 and 14 which are generally parallel with the direction of travel of the vehicle so as to be forward facing. The tracks are of standard aircraft cargo and seat securement cross section and made of high strength extruded aluminum alloy with attachment points in one inch increments or spacings. The track sections will be bolted to the vehicle floor by grade 5 or better bolts through 2 inch by ⅛ inch thick backing plates for each bolt and with the bolts spaced o 4 inch centers. Sufficient anchoring strength is imparted to the track sections under the above anchoring specifications to make securement for the wheelchair equivalent to a vehicle seat. Arrangement of the track sections on the floor will be discussed with respect to FIGS. 8 and 9.

Wheelchair C has side frames with forward generally vertical frame members 20, rear vertical frame members 22 and arm rests 24 as seen in FIG. 1. Description of all parts of the chair frame is not considered to be necessary except to say that the frame members are secured together as a unitary structure on both the sides and transversely even if the chair is a type which folds up for convenient transporting and storage when not in use. The frame supports the large diameter drive wheels 26 which have conventional hand gripping and propelling rings 28. Forward caster wheels 30 are located generally in line with the rear wheels though precise wheel locations varies according to manufacturer design.

Figure 3:
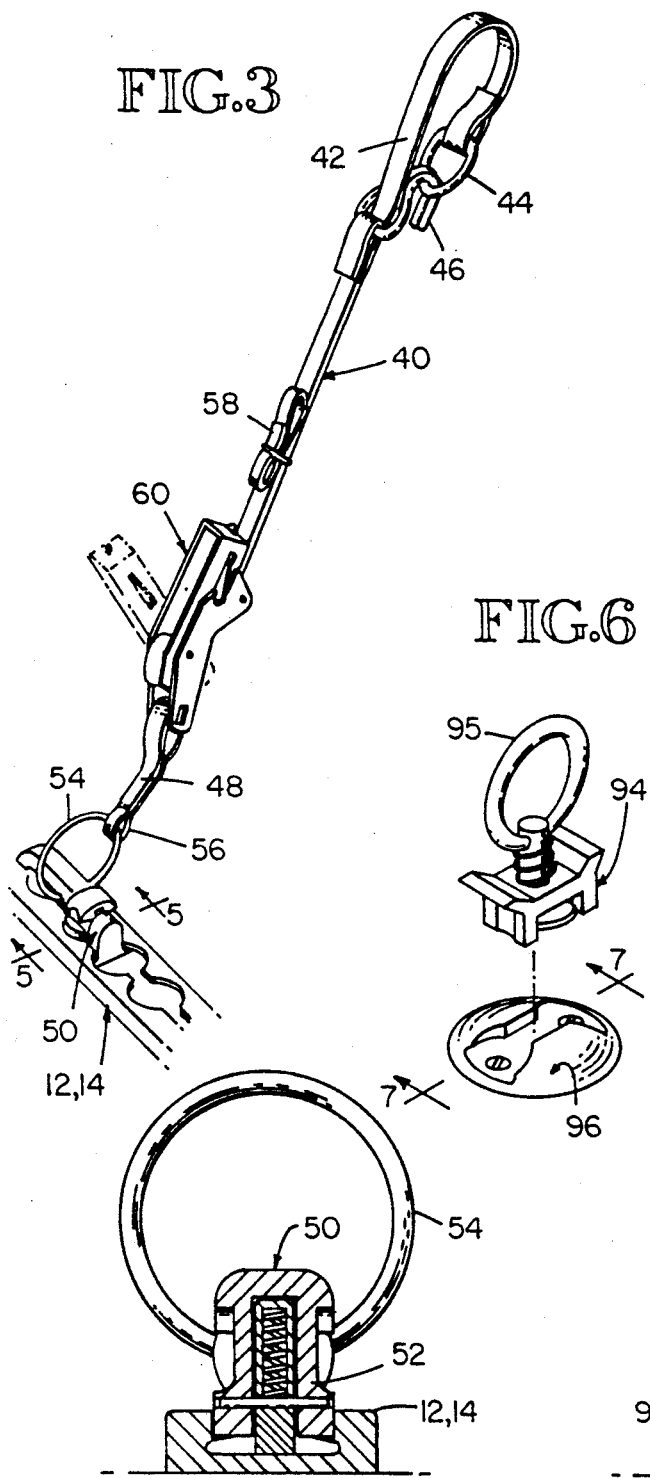
FIG. 3 is a perspective view of the type of belt used as a restraint for the wheelchair frame.
Figure 4:
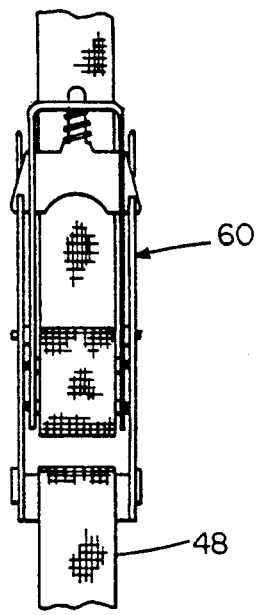
FIG. 4 is a partial front elevation view of the cinching buckle for use with the wheelchair tie-down belts.

The securement system for the chair is comprised of four belts or straps generally designated by the number 40 and show in greater detail in FIGS. 3 and 4. The belts have an upper detachable loop portion with detachable ring 44 coacting with hook 46 for quick and convenient connection to a part of the chair frame such as frame members 20, 22 and 24 as shown in FIG. 1. The lower end portion 48 of each belt 40 includes standard track fitting 50 which is a single or double cargo stud which is easily inserted into and removed from the track by simply lifting the spring loaded retainer piece 52 and sliding the fitting in the track. The anchoring fitting 50 includes ring 54 secured on loop 56 of the belt. Once a chair securement belt 40 has been attached at both ends and the slack taken out by cinching up on the free end 58, the standard buckle 60, Which in this instance is an overcenter type and applies final tension to the tie-down belt. With such a tie-doWn belt on each of the four corners of the chair frame the chair is restrained in position as securely as the vehicle seats themselves.

Figure 2:
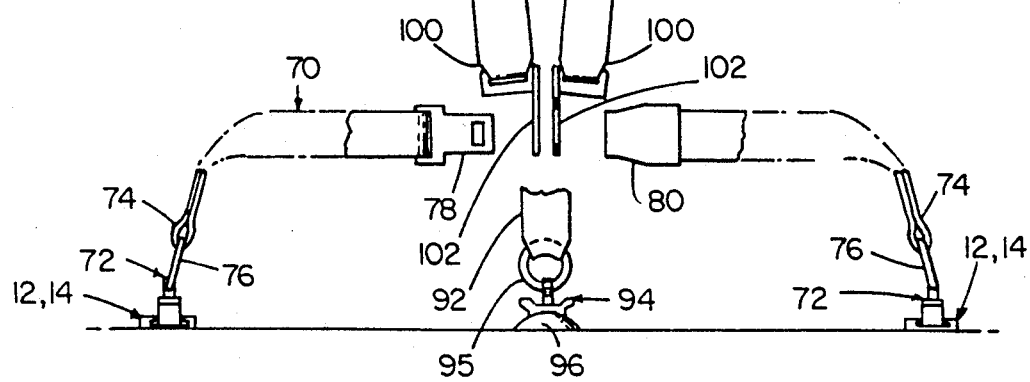
FIG. 2 is a partial frontal view in elevation showing additional details of the passenger lap and shoulder harness restraint portion of the system.
Figure 6:
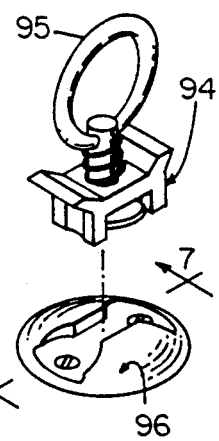
FIG. 6 is a view in perspective of the floor tie-down means for the shoulder harness.
Figure 5:
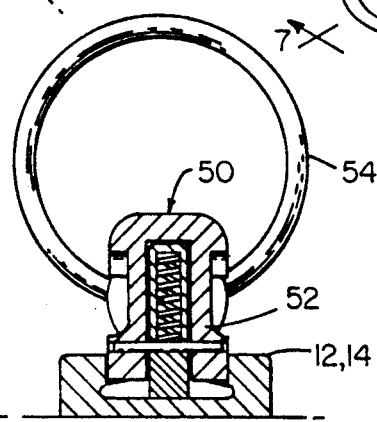
FIG. 5 is a cross section view taken along the line 5—5 of FIG. 3 showing details of construction of the anchoring fixture for the belts.
Figure 7:
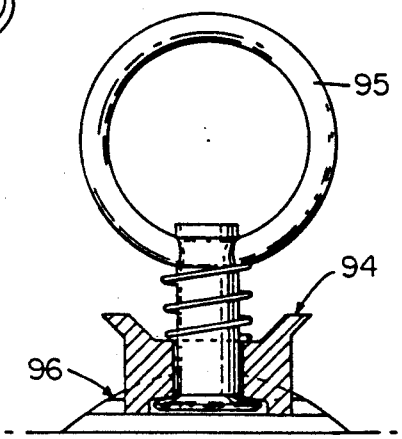
FIG. 7 is a cross section view taken along the line 7—7 of FIG. and 6 and showing additional details of the tie-down of FIG. 6, FIGS. 8 and 9 are diagrammatic plan views illustrating the arrangement of tie-down tracks for a wheelchair.

The passenger securement, being independent of the chair restraint, is shown best in FIGS. 1 and 2. Lap belt 70 has track or floor tie-down fittings 72 similar to fittings 50 with ring 76 attached to loop 74 on the belt. One of the two sections of the lap belt have a male buckle section 78 and the other has female buckle section 80 to be releasably joined in the usual manner. The passenger shoulder harness, generally designated by the number 90, includes a single floor strap portion 92 which extends from floor fitting 94 which detachably connects to anchor plate 96. Floor strap section 92 extends upwardly and divides into two shoulder strap sections 98. The lap end 100 of each shoulder strap section 98 includes a metal attachment loop 102 each of which slips onto the nose of male buckle section 78 of the lap belt whereupon male section 78 can be inserted to secure shoulder harness and lap belt together. Slack or strap length adjuster buckles 104 are provided on the chest part of the shoulder straps 98 for easy and quick adjustment of the harness to the passenger. Note in FIGS. 6 and 7 that the anchoring plate 96 accepts releasable fitting 94 with ring 95 attached to loop 74 of the floor end of the harness 90. The anchoring fitting 94,96 is generally centered with respect to the rear end and between track sections 12 and 14.

FIGS. 10 and 11 show a different embodiment of track 110 with tie-down securement fittings 112 adapted to the configuration of the track. The track and fitting of FIGS. 10 and 11 are presented as illustrative of the fact that a specific floor tie-down fitting and track is not the essence of the invention but that the combination of elements in the restraint system as a whole is the novel aspect of the invention herein.

FIGS. 8 and 9 show two layouts of track for the system. In one arrangement track sections 12 and 14 are single one piece lengths, approximately 4 feet long and spaced approximately 29¼ inches apart on center lines. On the other hand, the track can be installed in four two foot sections as shown in the layout in FIG. 9. Thus the two forward sections of track are disposed at the 29¼ inch interval while the two rear two foot sections are disposed on the inside of the drive wheels on 18 inch centers. Again the precise dimensions are mentioned as illustrative only of the flexibility of the invention in adapting the system to a particular vehicle.

A stanchion support 120 is provided if desired such that the shoulder harness can extend straight back and then down to the anchoring plate means. Stanchion 120 is a U-shaped tubing having top cross member 122 and vertical side members 124 with forawrdly angling gusset support bars 126. An appropriate track anchoring means attaches the stanchion at four points to the tracks. The stanchion actually is a space saver since the harness extends generally horizontally rearwardly from the occupant and then can extend veitically down to the anchoring plate.

FIG. 12 shows that the adjustment buckles or hardware 104 can be located to the rear of the wearer's shoulders instead of in front as shown in FIG. 2. It will be clear that the adjustment hardware 104 is between the occupant of the chair and the stanchion 120. It will be appreciated that anchoring the harness for the wheelchair passenger can be in the ceiling of the vehicle as well as on the floor. It is to be understood that wheelchair securement systems must satisfy strict specifications promulgated by the the Department of Transportation Motor Vehicle Safety Standards. Rearwardly extending belts from the occupant's shoulders can only angle upwardly a maximum of 80 degrees from the horizontal or downward a maximum of 40 degrees from the horizontal. the angle of the shoulder strap sections in this invention extend more nearly horizontally to the stanchion cross piece 122 and then can run vertically up or down to floor or ceiling.

In FIG. 12 the "D" ring 99 is disposed between the adjustment buckles 104 and the floor strap 92. Shoulder strap 98 in this embodiment is a single length of belt which passes around the straight part of the "D" ring as shown and still crosses over both shoulders but with adjustment buckles 104 to the rear of the shoulders. The "D" ring allows the belt section 98 to slide and equalize pressure on the two shoulder strap sections if the occuPant moves or shifts position.

I claim:

1. In a vehicle having a floor area for securement of a wheelchair having frame structure, securement system improvements comprising:

a) elongated tie-down track means secured to said vehicle floor area, said elongated tie-down track means including spaced apart and generally parallel tie-down track sections having a series of attachment means along the length thereof at predetermined intervals, each of said spaced apart track sections being located on the floor to secure a side of said wheelchair frame structure, b) first securement belt means for said wheelchair frame structure, said first belt means including belt means for the forward and rearward parts of said frame structure on each side thereof so that four said first securement belt means attach to said attachment means on said track sections and attach to said forward and rearward parts of said wheelchair frame structure to securely hold said wheelchair in its designated floor area, c) wheelchair occupant belt securement means including a lap belt means which secures to track sections at both ends thereof at either side of said wheelchair and which detachably buckles between the ends thereof, and d) occupant shoulder harness means having a floor strap one end of which attaches to anchoring means to the rear of and generally central to said track sections and which said harness means includes a double shoulder strap portion so that one shoulder portion passes over each shoulder of the occupant, each said shoulder portion detachably connecting to said lap belt and converging to be connected to each other to the rear of the occupant, wherein the occupant belt securement means is independent of said wheelchair frame structure first securement belt means, e) a "D" ring means disposed between said double shoulder strap means and said floor strap such that the floor strap is secured thereto and said double shoulder strap portion loops through and slides with respect to said "D" ring to permit the pressure on both shoulders of the chair occupant to be equalized by allowing said double shoulder strap means to slide through said ring, f) stanchion means provided to the rear of said chair and attached to said track means independently of securement for said wheelchair frame and for said occupant, said "D" ring means of said shoulder harness means being located generally rearwardly of said occupant's shoulders and forwardly of said stanchion means so that said floor strap means passes over said stanchion means to said anchoring means to the rear of said stanchion.

2. The wheelchair securement system according to claim 1 and wherein said tie-down track sections are comprised of a pair of parallel track sections located a predetermined distance apart and which are approximately four feet in length.

3. The wheelchair securement system according to claim 1 and wherein said tie-down track sections are comprised of four spaced apart and generally parallel track sections with two said sections for each side of said wheelchair frame, each of said two track sections per side being about four feet in overall length.

* * * * *